United States Patent
Vessot et al.

(10) Patent No.: US 10,036,318 B2
(45) Date of Patent: Jul. 31, 2018

(54) AIR CIRCULATION DEVICE FOR TURBOMACHINE

(71) Applicant: SNECMA, Paris (FR)

(72) Inventors: Christian Vessot, Moissy-Cramayel (FR); Matthieu Leyko, Moissy-Cramayel (FR)

(73) Assignee: SNECMA, Paris (FR)

( * ) Notice: Subject to any disclaimer, the term of this patent is extended or adjusted under 35 U.S.C. 154(b) by 405 days.

(21) Appl. No.: 14/978,799

(22) Filed: Dec. 22, 2015

(65) Prior Publication Data

US 2017/0175554 A1    Jun. 22, 2017

(51) Int. Cl.
  *F02C 6/08*      (2006.01)
  *F02C 7/12*      (2006.01)
  *F02C 7/18*      (2006.01)

(52) U.S. Cl.
  CPC ............... *F02C 6/08* (2013.01); *F02C 7/125* (2013.01); *F02C 7/18* (2013.01)

(58) Field of Classification Search
  CPC .... F02C 6/08; F02C 7/125; F02C 7/18; F01D 25/12; F01D 9/065; F01D 25/14; F01D 17/105; F01D 9/02; F04D 27/023; F04D 29/584
  See application file for complete search history.

(56) References Cited

U.S. PATENT DOCUMENTS 1,376,178 A      4/1921   Wagenseil
3,058,302 A  *  10/1962   Knzyk ................. F02C 7/18
                                                        29/888
5,123,242 A  *   6/1992   Miller ................. F02C 7/14
                                                       165/300

(Continued)

FOREIGN PATENT DOCUMENTS

CH      330267        5/1958
EP   1 882 824 A2    1/2008

(Continued)

OTHER PUBLICATIONS

Search Report dated May 31, 2016 in United Kingdom Patent Application No. GB1522685.5.

(Continued)

*Primary Examiner* — Eldon Brockman
(74) *Attorney, Agent, or Firm* — Oblon, McClelland, Maier & Neustadt, L.L.P.

(57) ABSTRACT

A device for circulation of air for a turbomachine, the device including an inlet provided to receive incident airflow, air circulation ducts connected to the inlet, a central part including side walls, peripheral walls arranged at a distance from the central part, so as to form the air circulation ducts, each duct being arranged between one of the side walls of the central part and one of the peripheral walls, each peripheral wall including an upstream end portion delimiting with one of the side walls an inlet orifice of one of the ducts and a downstream end portion delimiting with one of the side walls an outlet orifice of one of the ducts, at least one member mobile in translation relative to the peripheral walls, the at least one mobile member being formed in the central part and arranged so that its displacement varies a section of each of the inlet orifices and a section of at least one of the outlet orifices.

19 Claims, 6 Drawing Sheets

(56) References Cited

U.S. PATENT DOCUMENTS

| | | | | |
|---|---|---|---|---|
| 9,790,893 B2* | 10/2017 | Snyder | ............... | F02K 3/115 |
| 2008/0016845 A1 | 1/2008 | Zysman et al. | | |
| 2010/0300066 A1 | 12/2010 | Bulin et al. | | |
| 2015/0330309 A1* | 11/2015 | Bagnall | ............... | F02C 6/08 |
| | | | | 60/785 |

FOREIGN PATENT DOCUMENTS

| | | |
|---|---|---|
| EP | 2 085 600 A2 | 8/2009 |
| FR | 3 024 495 A1 | 2/2016 |
| FR | 3 024 496 A1 | 2/2016 |
| WO | WO 2009/007564 A2 | 1/2009 |

OTHER PUBLICATIONS

French Preliminary Search Report and Written Opinion dated Mar. 31, 2015 in Patent Application No. FR 1457452 (with English translation of Categories of Cited Documents).

* cited by examiner

AIR CIRCULATION DEVICE FOR TURBOMACHINE

FIELD OF THE INVENTION

The present invention relates to a device for circulation of air for a turbomachine.

PRIOR ART

In the field of aeronautics, devices for circulation of air in a turbomachine are used for multiple applications such as pressurisation of an aircraft cabin or cooling of coolants used in this turbomachine.

In these applications, air is generally taken from a secondary vein of the turbomachine and it is required to adapt the quantity of air taken from this secondary vein as exactly as possible.

The prior art discloses multiple devices for taking air circulating in such a secondary vein.

A known type of device for circulation of air is illustrated in FIG. 5 of document EP 0 469 825 A2. This device comprises a central part arranged in incident airflow, this central part having a pair of flaps each capable of closing a corresponding opening made in a side wall of the central part. Each flap once open delimits a wall of a separate air circulation duct which directs air towards a heat exchanger. The two flaps are each articulated on a vertical axis at a side upstream of the flap, and are mobile in rotation by means of the same actuator.

Via a control of the actuator, each flap can pivot towards the interior of the central part to meter the airflow entering the corresponding duct. According to the angle of inclination of the flap, the latter in fact lets more or less air enter the duct.

However, a disadvantage of such flaps mobile in rotation is that of provoking air recirculation when the latter are open in the corresponding ducts. Also, in the configuration described in EP 0 469 825 A2 the two air circulation ducts join up immediately downstream of the flaps to direct air towards the same heat exchanger. This configuration is not adapted to the formation of completely separate ducts so as to be able for example to have separate heat exchangers in each duct.

Also, the mechanical link between the actuator and the two flaps comprises a relatively complex series of connecting rods pivoting on axes and articulated to each other by ball ends, which is likely to cause articulation clearance, and as a consequence imprecision in the positioning of the flaps and therefore in the regulation of flow as proposed.

Document U.S. Pat. No. 1,376,178 also discloses, and in particular from FIG. 6 of this document, a device for circulation of air comprising a mobile central part relative to peripheral walls.

Arranged between the central part and the peripheral walls are several air circulation ducts each having an inlet orifice and an outlet orifice.

The central part has two pointed arch elements connected by a rod. When the central part is moved relative to the peripheral wall, the section of the inlet orifices and the section of the outlet orifices vary simultaneously.

However, it is not possible to control the airflow entering each duct independently of the airflow exiting from the same duct.

Also, it is not possible with this device to control the airflow exiting from a duct independent of the airflow exiting from another duct.

Another disadvantage of this known device is that the particular forms of the peripheral walls and of the pointed arch element arranged at the outlet orifices of the ducts generate turbulence or even recirculation of airflow when leaving the ducts, in particular when the central part is in a maximal opening position of the sections of the inlet and outlet orifices. The laminar outer airflow along the peripheral wall at outlet and the inner airflow deviated towards each outlet orifice by the downstream pointed arch element in fact have very different directions, each tilted relative to the other at an angle of the order of 60°. The confluence of these two flows therefore generates considerable turbulence. The result is that the aerodynamic drag generated by this former device is relatively substantial, in particular in the maximal opening position of the central part.

Yet another disadvantage of this known device is that the actuator(s) dedicated to displacement of the mobile central part, not shown in the figures of the document, cannot be installed inside the space arranged between the peripheral walls without perturbing the airflow in at least one of the air circulation ducts.

EXPLANATION OF THE INVENTION

The aim of the invention is to eliminate at least one of the above disadvantages of the prior art.

A device for circulation of air for a turbomachine is therefore proposed, the device comprising:
  an inlet provided to receive incident airflow,
  air circulation ducts connected to the inlet,
  a central part comprising side walls,
  peripheral walls arranged at a distance from the central part so as to form the air circulation ducts, each duct being arranged between one of the side walls of the central part and one of the peripheral walls, each peripheral wall comprising:
    an upstream end portion delimiting with one of the side walls an inlet orifice of one of the ducts,
    a downstream end portion delimiting with one of the side walls an outlet orifice of one of the ducts,
  at least one member mobile in translation relative to the peripheral walls, the at least one mobile member being formed in the central part and arranged so that its displacement varies:
    a section of each of the inlet orifices,
    a section of at least one of the outlet orifices, wherein:
  the downstream end portion of each peripheral wall has a rectilinear profile,
  each side wall of the central part successively comprises:
    a first portion having a rectilinear profile,
    a second portion having a profile curved at least in part and extending the first portion,
    a third portion having a rectilinear profile, extending the second portion and extending in the same plane as an downstream end portion of a peripheral wall.

Due to the particular arrangements of the different portions in the peripheral walls and the side walls of the central part, air can circulate in the different ducts as far as the outlet orifices, with minimising of the aerodynamic drag generated by the device.

The device for circulation of air can also comprise the following characteristics, taken singly or in combination each time this is technically possible.
  at least one mobile member comprises a first mobile member arranged so that its displacement simultaneously varies the section of each of the inlet orifices, and a second mobile member arranged so that its displacement varies the section of at least one outlet orifice independently of the first mobile member;

the device comprises a first actuator for shifting the first mobile member, and a second actuator for shifting the second mobile member;

the first mobile member comprises the first rectilinear portion of a first of the side walls of the central part, and the second mobile member comprises the second portion of the first side wall;

the third portion of the first side wall is fixed relative to the peripheral wall facing the first side wall;

the second portion and the third portion of a second of the side walls of the central part are fixed relative to the peripheral wall facing the second side wall;

the at least mobile member comprises a first mobile member arranged so that its displacement simultaneously varies the section of each of the inlet orifices, a second mobile member arranged so that its displacement varies the section of one of the outlet orifices, independently of the first mobile member, a third mobile member arranged so that its displacement varies the section of another of the outlet orifices, independently of the first mobile member and independently of the second mobile member;

the device comprises a first actuator for shifting the first mobile member, a second actuator for shifting the second mobile member, and a third actuator for shifting the third mobile member;

the device comprises a first actuator for shifting the first mobile member, and a common actuator connected to the second mobile member and to the third mobile member to move it simultaneously;

the first mobile member comprises the first rectilinear portion of a first of the side walls and of a second of the side walls, and the second mobile member comprises the second portion of the first side wall, and the third mobile member comprises the second portion of the second side wall;

the third portion of the first side wall and the third portion of the second side wall are fixed relative to the peripheral walls;

the at least one mobile member is a single mobile member arranged so that its displacement simultaneously varies the section of each of the inlet orifices, and the section of each of the outlet orifices;

in each side wall, the first portion is integral with the second portion, and the third portion is mobile relative to the first and second portions;

the third portion of each side wall is fixed relative to the peripheral walls;

the second portion of at least one of the side walls of the central part has an S-shaped profile;

the second portion of at least one of the side walls of the central part comprises at least one end portion having a rectilinear profile, said end portion being adapted to slide with contact along one of the first and third portions of the side wall;

the second portion comprises two opposite end portions which extend respectively in two planes parallel to each other;

in the event of breakdown the device comprises at least one actuator adapted to stress at least one mobile member towards a safety position in which each orifice section which said member varies is maximal;

the device comprises at least one actuator adapted for shifting at least one mobile member and housed in the space in between the side walls of the central part.

DESCRIPTION OF FIGURES

Other characteristics, aims and advantages of the invention will emerge from the following description which is purely illustrative and non-limiting and which should be considered relative to the appended drawings, in which.

In all figures, similar elements have identical reference numerals.

DETAILED DESCRIPTION OF THE INVENTION

Figure 1:
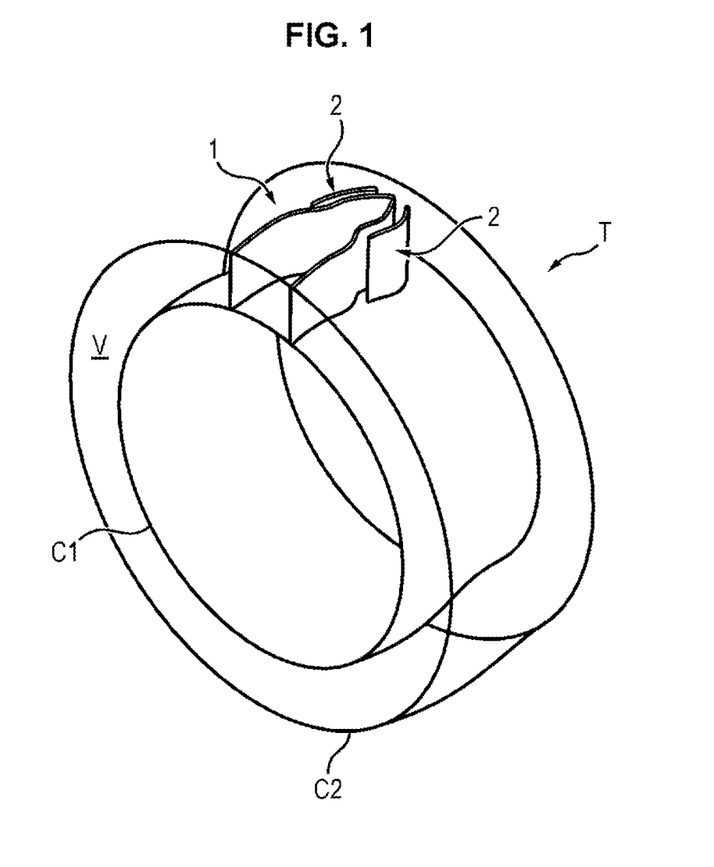
FIG. 1 illustrates a part of a turbomachine according to a three-dimensional view, according to an embodiment of the invention.

In reference to FIG. 1, a system for circulation of air T in an aircraft turbomachine comprises an inner annular casing C1 extending around a principal axis (not illustrated), and an outer annular casing C2 coaxial with the inner annular casing and arranged radially outside the inner annular casing C1. An annular space is arranged between the two casings C1 and C2, this space constituting at least one vein V, for example a secondary vein in a dual-flow turbomachine, in which fluid such as air flows according to a direction substantially parallel to the axis of the turbine when the turbine is in operation.

Arranged in this secondary vein V is a device for circulation of air 1 having two peripheral walls 2 each extending between the two casings C1 and C2 radially relative to the axis of the turbine, and a central part 3 extending also between the two casings C1 and C2 radially relative to the axis of the turbine, and also between the two peripheral walls 2.

The device 1 shown is integrated upstream of an arm extending radially in the secondary vein V, for example a service arm. By way of simplification of the figure, only an upstream portion of the arm is shown.

Figure 2:
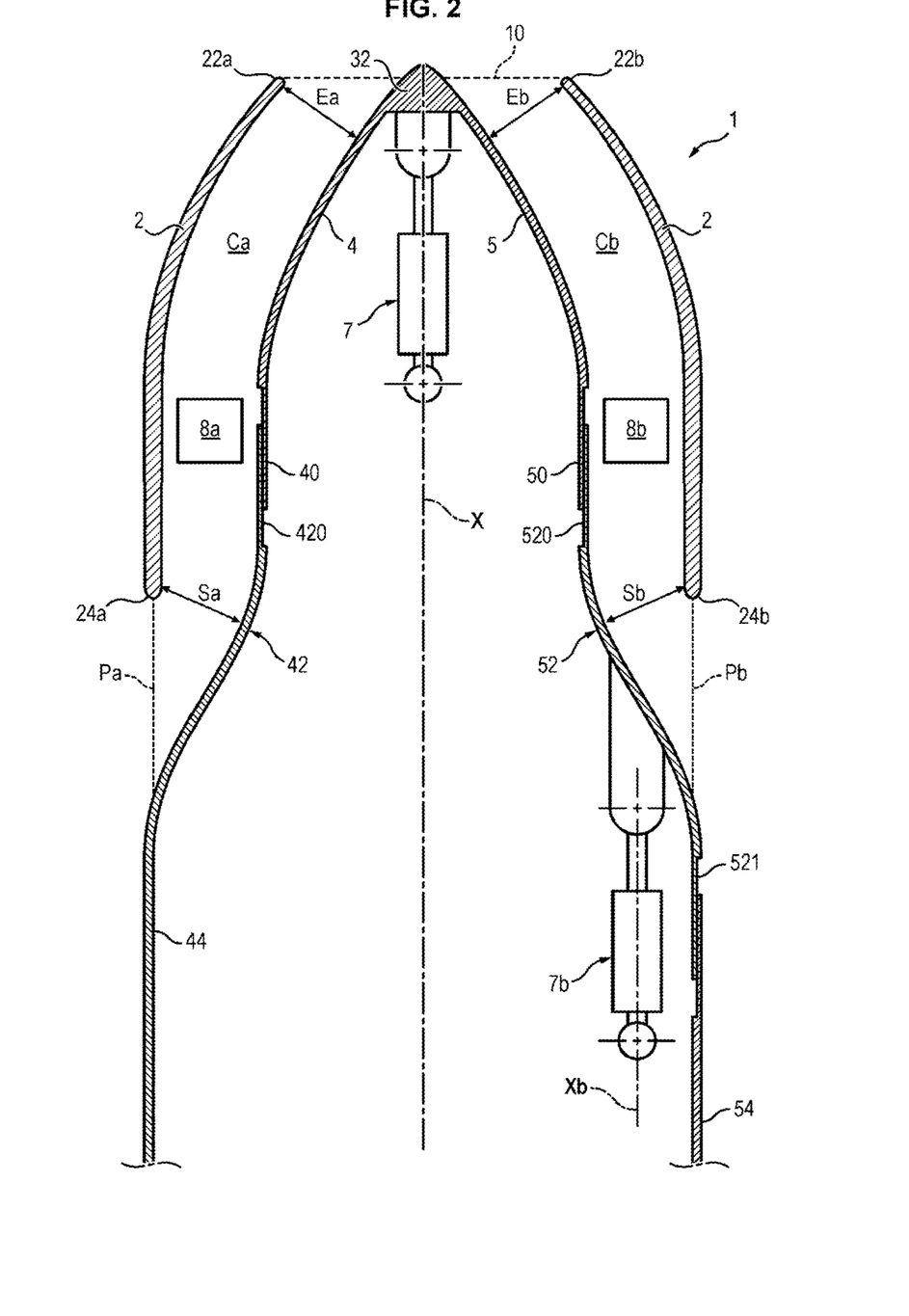
FIG. 2 is a sectional view of a device for circulation of air according to a first embodiment of the invention.

FIG. 2 shows a view in longitudinal section of the air circulation device 1, according to a section plane substantially perpendicular to a diametrical straight line of the assembly T passing through a centre of the device 1.

Hereinbelow, the "profile" of an element of the circulation device 1 will refer implicitly to the profile of this element in this section plane.

The two peripheral walls 2 extend longitudinally and each has two opposite end portions: an upstream end portion 22a or 22b and a downstream end portion 24a or 24b. The peripheral walls 2 are fixed relative to the two annular casings C1 and C2.

The two upstream ends 22a, 22b delimit with the two casings C1 and C2 an inlet 10 of the air circulation device 1, this inlet 10 terminating in the secondary vein V so as to sample a small portion of the secondary airflow circulating in the secondary vein.

Hereinbelow, the terms "upstream" and "downstream" refer to the direction of flow of the secondary airflow, and therefore the direction of flow in the circulation device 1.

The central part 3 is arranged between the two peripheral walls 2, and extends along a longitudinal axis X passing through a geometric centre of the inlet 10 of the device 1 and parallel to the principal axis of the assembly T. The section plane of the FIG. 2 is perpendicular to a longitudinal plane comprising the longitudinal axis X and the principal axis of the assembly T. This longitudinal plane, which is therefore perpendicular to the plane of FIG. 2 and contains the axis X, is a median plane which in the example shown forms a plane of symmetry of the air circulation device 1.

The central part 3 has a leading edge 32 substantially in the middle of the inlet 10 and two side walls 4 and 5, or flanks, extending from this leading edge 32 on either side of the longitudinal median plane.

Each side wall 4, 5 is facing and at a distance from a respective peripheral wall 2 of the air circulation device 1.

Arranged between a peripheral wall 2 and the side wall facing the latter is an air circulation duct Ca or Cb attached to the inlet 10 of the device 1 delimited by the peripheral walls 2.

Each circulation duct Ca, Cb arranged between a side wall 4, 5 and a peripheral wall comprises an inlet orifice Ea, Eb and an outlet orifice Sa, Sb.

The inlet orifice Ea is delimited by the side wall 4 and the upstream end portion 22 of the peripheral wall 2 facing the latter.

The inlet orifice Eb is delimited by the side wall 5 and the upstream end portion 22 of the peripheral wall 2 facing the latter.

The outlet orifice Sa is delimited by the side wall 4 and the downstream end portion 24a of the peripheral wall facing the latter.

The outlet orifice Sb is delimited by the side wall 5 and the downstream end portion 24b of the peripheral wall facing the latter.

The side wall 4 (respectively 5) comprises several successive portions: a first portion 40 (respectively 50) having a rectilinear profile, a second portion 42 (respectively 52) having a profile curved at least in part and extending the first portion 40 (respectively 50), and a third portion 44 (respectively 54) having a rectilinear profile and which prolongs the second portion 42 (respectively 52).

The third portions 44, 54 can form part of the aerodynamic fairing of an arm extending radially in the secondary vein V, for example a service arm. The side walls 4, 5 are each extended towards the downstream by a curved wall of this aerodynamic fairing, not shown, the two curved walls then joining up on the longitudinal median plane and forming a downstream pointed arch so as to avoid detachment of the airflow downstream of the device 1 and improve the aerodynamic drag of the device.

The first portions 40, 50 extend in respective first planes parallel to the longitudinal axis X.

The third portion 44 (respectively 54) extends in a second plane Pa (respectively Pb) substantially parallel to the longitudinal axis X, the downstream end portion 24a (respectively 24b) of the peripheral wall 2 facing also extending in the second plane Pa (respectively Pb).

The second planes Pa, Pb are further away from the axis X than the first planes of the first portions 40, 50.

Each of the second portions 42, 52 has an S-shaped profile, in the sense where this profile comprises an inflection point, preferably a single inflection point. Advantageously, for each of the second portions 42, 52, a plane tangential to the S-shaped profile at the point of inflection forms an angle less than or equal to 45° relative to the second plane Pa, Pb which here is parallel to the longitudinal axis X. In the embodiments shown in FIGS. 2 to 4, this angle is of the order of 30°. The result is that the laminar outer airflow along a peripheral outlet wall 2, parallel to a second plane Pa or Pb, and the airflow of each air circulation duct Ca, Cb directed towards each outlet orifice by a second portion 42, 52 have directions tilted relative to each other of an angle less than or equal to 45°, and more preferably less than 35°. The aerodynamic perturbations due to the confluence of each outlet flow of a duct Ca, Cb with the laminar outer airflow are therefore minimised, in comparison especially with the known device of document U.S. Pat. No. 1,376,178.

The peripheral walls 2 can be symmetrical relative to each other according to the longitudinal median plane, which is the case in the examples shown in relation to all the figures of the present document.

Also, the device for circulation of air 1 comprises at least one member mobile in translation relative to the peripheral walls, arranged so that its displacement varies:
  a section of each of the inlet orifices, and
  a section of at least one of the outlet orifices,
  the or each mobile member being formed in the central part 3.

The or each mobile member shifts in translation parallel to the longitudinal axis X.

The device 1 can comprise a single mobile member or several mobile members.

The central part 3 is hollow between its side walls 4, 5. In this hollow space, at least one actuator is arranged for shifting the or each mobile member. Service passages, such as for example fluid circulation ducts, can also be arranged in the central part 3.

Figure 3:
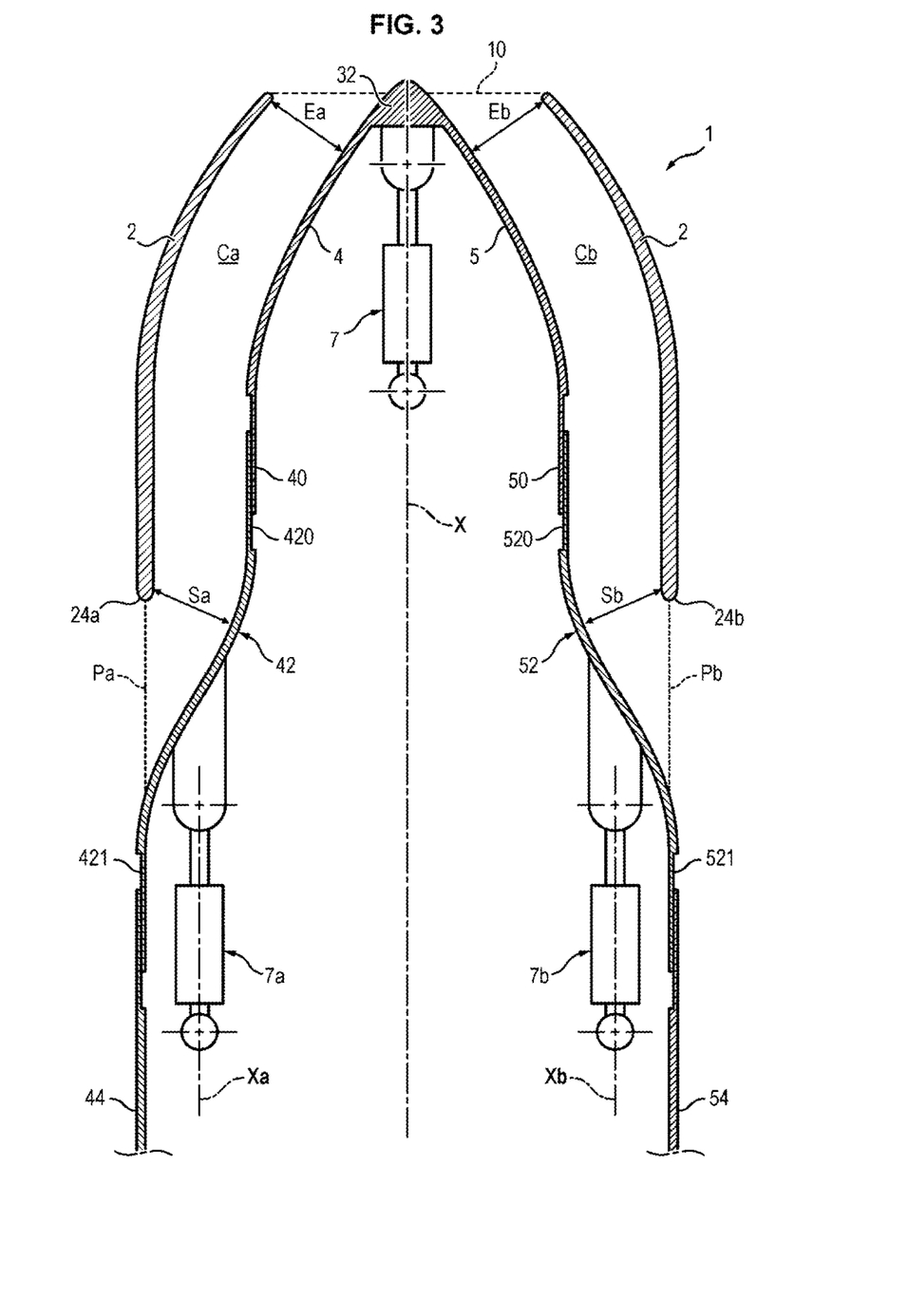
FIG. 3 is a sectional view of a device for circulation of air according to a second embodiment of the invention.
Figure 4:
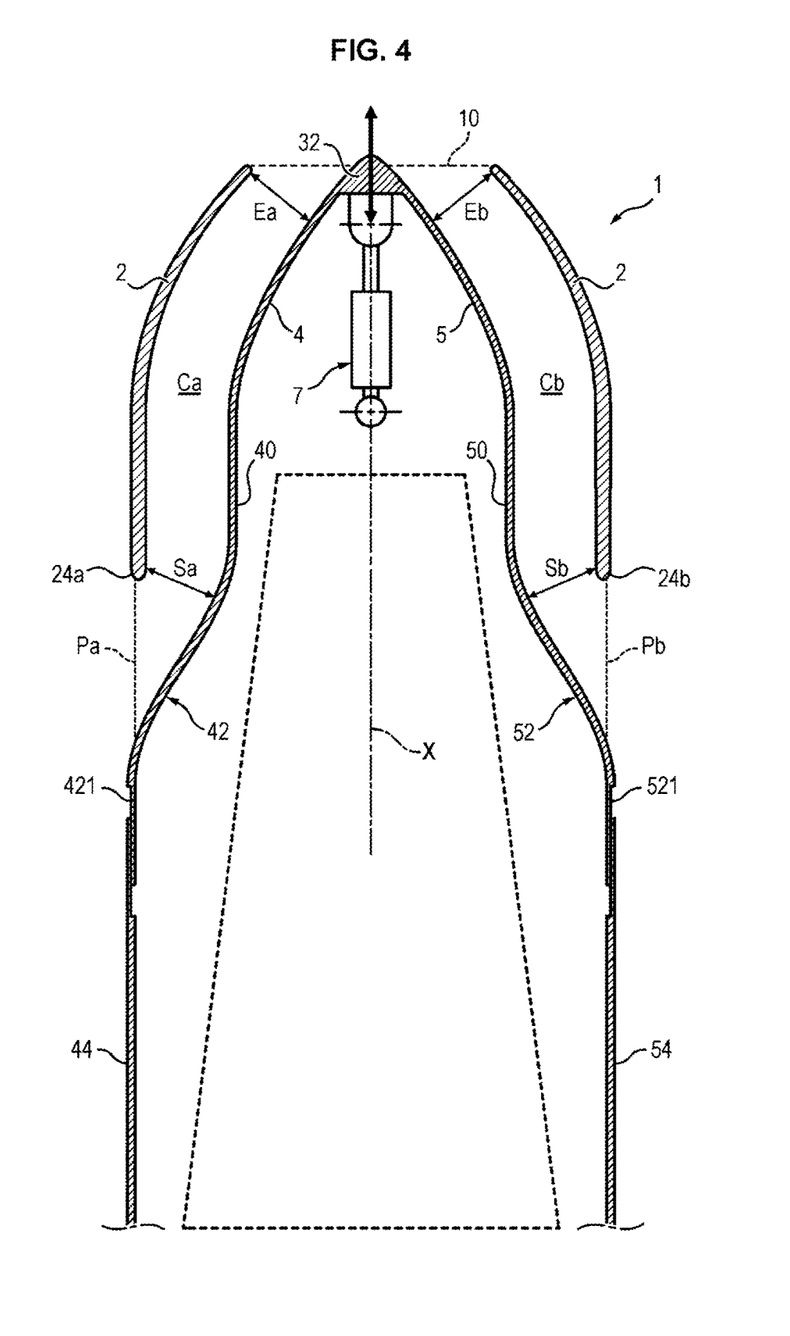
FIG. 4 is a sectional view of a device for circulation of air according to a third embodiment of the invention.

The two side walls can be symmetrical relative to each other according to the longitudinal median plane for at least one position of the or each mobile member, which is the case in the examples shown in relation to FIGS. 2 to 4.

FIG. 2 illustrates a first embodiment of the device 1 comprising two mobile members: a first mobile member arranged so that its displacement simultaneously varies the section of each of the inlet orifices, and a second mobile member arranged so that its displacement varies the section of an outlet orifice independently of the first mobile member.

More precisely, the second mobile member is arranged so that its displacement varies the section of the outlet orifice.

The first mobile member comprises the first portions 40, 50 of the two side walls 4, 5, and the leading edge 32.

Each of the first portions 40, 50 is connected to the leading edge 32 by means of a wall of curved form.

The first mobile member is formed by a head having pointed arch profile.

Also, the second mobile member comprises the second portion 52 of one of the two side walls (the side wall 5).

The third portion 54 of the side wall 5 is fixed relative to the peripheral wall 2 facing the side wall 5.

Also, the second portion 42 and the third portion 44 of the other of the two side walls (the side wall 4, shown to the left in FIG. 2) are fixed relative to the peripheral wall 2 facing the side wall 4.

The second portion 42 and the third portion 44 of the side wall 4 are integral.

The second portions 42, 52 comprise at least one end portion having a rectilinear profile adapted to slide with contact along the first portions 40, 50, and the third portion 54.

In this way, the second portion 52 of the side wall 5 comprises two opposite end portions 520, 521 which slide with respectively the first portion 50 and the third portion 54.

Also, the second portion 42 of the side wall 4 comprises an end portion 420 on which the first portion 40 slides.

Each end portion 420, 520, 521 of the second portion 42, 52 is of tapered section relative to the section of the rest of the central portion so as to form a shoulder acting as stop to limit the sliding travel of the second portion 42, 52.

The first portions 40, 50 comprise a shoulder similar forming a stop to limit their sliding travel relative to the aux second portions 42, 52.

Each pair of portions of side walls sliding together constitutes a slide likely to prolong or shorten the apparent length of the corresponding side wall 4, 5 over a course of determined length, this course being optionally limited by the presence of the stops.

The air circulation device 1 also comprises a first actuator 7 for shifting the first mobile member, and a second actuator 7b for shifting the second mobile member.

The actuator 7 comprises a mobile part, for example constituted by a cylinder rod connected to the first mobile member, which moves along the longitudinal axis X. The actuator 7b comprises a mobile part, for example constituted by a cylinder rod connected to the second mobile member, which shifts along an axis Xb parallel to the axis X.

The device 1 operates as follows: incident airflow flows into the secondary vein V according to a direction parallel to the longitudinal axis X in the meridian plane of FIG. 2. This incident flow enters the device 1 via the inlet 10. The incident airflow is divided by the leading edge 32 into two airflows called sampling airflows which are distributed in the circulation ducts Ca, Cb. A first airflow is deflected into the duct Ca formed between the side wall 4 and the facing peripheral wall 2, whereas a second airflow is deviated in the duct Cb formed between the side wall 5 and the facing peripheral wall 2.

It is evident that the absence of elements projecting into the ducts Ca and Cb, from the peripheral and side walls prevents the development of perturbations and/or recirculation of air.

In this first embodiment, the outlet orifice Sb of the duct Cb has a variable section by displacement of the second portion 52 of the side wall 5 relative especially to the third portion 54, this displacement varying the distance between the end portion 521 of the second portion 52 and the downstream end portion 24b of the facing peripheral wall 2. The outlet orifice Sa of the duct Ca is per se of constant section, the second portion 42 of the side wall 4 being fixed.

In a second embodiment illustrated in FIG. 3, the air circulation device 1 comprises three different mobile members:
  a first mobile member arranged so that its displacement simultaneously varies the section of each of the inlet orifices Ea, Eb,
  a second mobile member arranged so that its displacement varies the section the outlet orifice Sb (to the right in FIG. 3), independently of the first mobile member, and
  a third mobile member arranged so that its displacement varies the section of the outlet orifice Sa (to the left in FIG. 3), independently of the first mobile member and independently of the second mobile member.

The first mobile member comprises the first portion 40, 50 of the two opposite side walls 4, 5 relative to the longitudinal axis X, as in the first embodiment.

The second mobile member comprises the second portion 52 of the side wall 5.

The third mobile member comprises the second portion 42 of the side wall 4.

Also, the third portions 44, 54 are fixed relative to the peripheral walls 2.

The second portions 42, 52 of the side walls comprise two opposite end portions 420, 421, 520, 521 which slide with respectively the first portion and the third portion of the same side wall.

The device 1 according to this second embodiment comprises a first actuator 7 for shifting the first mobile member, a second actuator 7b for shifting the second mobile member independently of the first mobile member, and a third actuator 7a for shifting the third mobile member independently of the first mobile member and of the second mobile member.

The actuator 7 comprises a mobile part, for example constituted by a cylinder rod connected to the first mobile member, which moves along the longitudinal axis X. The actuator 7b comprises a mobile part, for example constituted by a cylinder rod connected to the second mobile member, which moves along an axis Xb parallel to the axis X. The actuator 7a comprises a mobile part, for example constituted by a cylinder rod connected to the second mobile member, which moves along an axis Xa parallel to the axis X. The axes Xa and Xb are for example equidistant from the axis X.

In this second embodiment, the outlet orifice Sa has a variable section by displacement of the second portion 42 relative to the third portion 44, and the outlet orifice Sb has a variable section by displacement of the second portion 52 relative to the third portion 54. Different or identical outlet rates can be adjusted for the two ducts Ca and Cb.

In an embodiment, not illustrated, the second actuator 7b and the third actuator 7a can be replaced by a common actuator connected to the second mobile member and to the third mobile member to shift them simultaneously.

In another embodiment not illustrated, at least one of the second actuator 7b and the third actuator 7a comprises a mobile part connected to the second or the third mobile member and which moves in a direction forming an angle of less than 20° relative to the longitudinal axis X. The two end portions opposite a second or a third portion 52, 54 of the side wall 4, 5 therefore slide parallel to this same direction with respectively the first portion and the third portion of the side wall. The third portion 44, 54 of the side wall 4, 5 extends in a second plane Pa, Pb parallel to this same direction, and the downstream end portion 24a, 24b of the facing peripheral wall 2 also extends in the second plane Pa, Pb. Advantageously, for each of the second portions 42, 52, a plane tangential to the S-shaped profile at the point of inflection forms an angle less than or equal to 45° relative to the second plane Pa, Pb, and more preferably less than 35°. This embodiment relates in particular to an advantageous realisation of aerodynamic fairing of an arm integrating the air circulation device 1, in which a third portion 52, 54 of the side wall 4, 5 forms an angle relative to the longitudinal axis X, so as to move closely to the longitudinal median plane (passing through the longitudinal axis X) in progressing downstream.

In a third embodiment illustrated in FIG. 4, the air circulation device 1 comprises only a single mobile member arranged so that its displacement simultaneously varies the section of each of the inlet orifices Ea, Eb, and the section of each of the outlet orifices Sa, Sb.

In each of the two side walls 4, 5 of the device 1 according to this third embodiment, the first portion 40 (respectively 50) is integral with the second portion 42 (respectively 52).

Also, the first and second portions 40, 42 (respectively 50, 52) of the side walls 4 (respectively 5) are mobile relative to the third portion 44 (respectively 54). The third portions 44, 54 are fixed relative to the peripheral walls 2.

The second portions 42, 52 of the side walls each comprise an end portion 421, 521 which slides with respectively the third portion 44, 54 of the same side wall.

A single actuator 7 moves the single mobile member along the axis X.

In this third embodiment, the inlet Ea, Eb and outlet Sa, Sb orifices of the two ducts Ca, Cb arranged on either side of the longitudinal axis X have respective sections which all vary simultaneously, by displacement of the piece forming the single mobile member and comprising the first portions 40, 50 and the second portions 42, 52 of the side walls 4, 5.

A trapezoid area, shown in dotted lines, symbolises a fixed inner space in which a service passages can be arranged without impairing displacement of the single mobile member.

In the embodiments of FIGS. 2, 3 and 4 the actuators 7, 7a, 7b used are hydraulic cylinders. However, any other type of actuator can be provided in the air circulation device 1, in particular an electromechanical actuator to contribute to replacing a large number of hydraulic commands of the plane by electrical commands.

Figure 5:
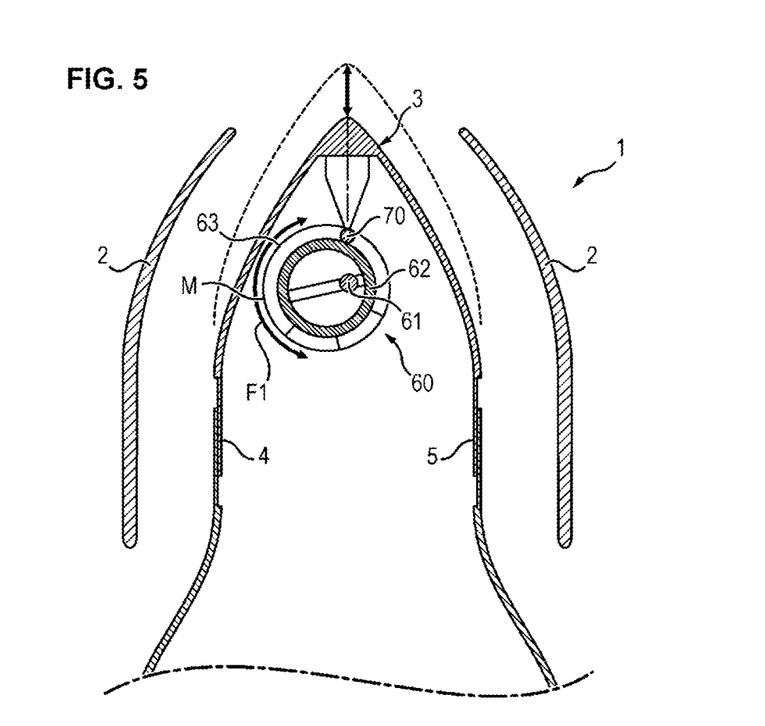
FIGS. 5 and 6 are sectional views of a device for circulation of air according to a fourth embodiment of the invention.

For example, in reference to FIG. 5, at least one actuator 7, 7a, 7b of the device 1 can comprise a cam driven in rotation on an axis extending perpendicularly to the plane of the figure, this cam cooperating with a cam follower formed with one of the mobile members, for example the first member comprising the leading edge 32.

A return spring can be provided to stress the leading edge of the central part downstream, that is, to guide it towards a retracted end position in which the respective sections of the inlet orifices of the ducts are maximal. This retracted end position is also a safety position of the mobile member in the sense where the cooling capacity of equipment such as a heat exchanger by sampling airflow is maximal. As an alternative, a return spring can stress the axis of the cam to pivot the cam towards its position corresponding to the safety position of the mobile member. In case of problem on the actuator, for example on an electric motor provided to drive the axis of the cam in rotation, stressing the return spring on the first mobile member or on the axis of the cam guides the cam and the cam follower into the position corresponding to the maximal recoil of the first mobile member. In the event of breakdown the actuator is therefore adapted to stress the mobile member 4 towards its safety position.

Figure 6:
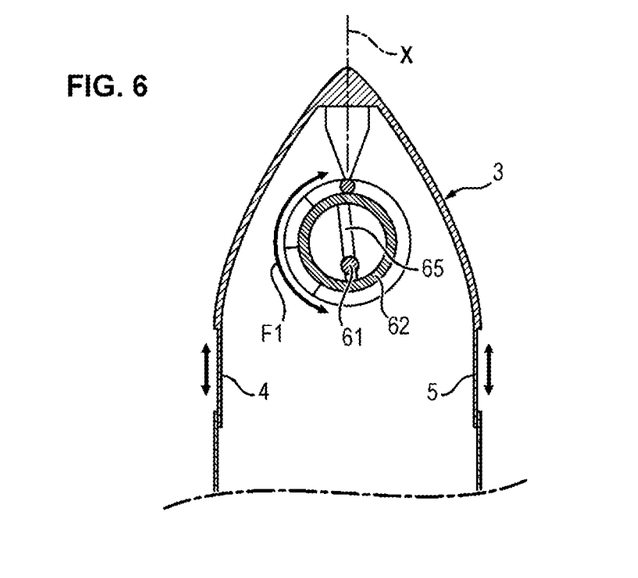

An example of such an embodiment is shown in FIGS. 5 and 6. The actuator comprises a rotary cam 60 in the form of an eccentric member which can pivot about an axis 61 located for example in the plane of symmetry of the first mobile member. The rotary cam 60 comprises a cylindrical outer wall 63 fixed to a coaxial cylindrical inner wall 62 of smaller diameter, the central axis of the two walls 62, 63 being parallel to the axis of rotation 61 of the cam 60. These two walls 62, 63 present between them a radial space forming a guide rail for a cam follower constituted by a roller 70 mounted to rotate on an axis fixed to the inner surface of the first mobile member.

The roller 70 extends parallel to the axis of rotation 61 of the cam 60, and is placed in the radial space between the two walls 62, 63 so as to then sequentially roll on one and on the other of the two walls. It is understood that the diameter of the roller 70 is sufficiently less than the radial distance between the two walls 62, 63 so that the roller cannot be in simultaneous contact with both walls and avoid any risk of pinching the roller which would cause blockage of the kinematics.

In FIG. 5, the first mobile member is shown in a slightly advanced position relative to its retracted end position corresponding to the maximum of sections of air passages. The displacement of the first mobile member from one end position to another, that is, between the advanced and retracted end positions corresponding respectively to the minimum and maximum of the sections of air passages, occurs via displacement of around a half-turn of the cam 60. The peripheral edge of the cam 60 at its point M the farthest from the axis 61 describes a trajectory shown in dotted lines by arrow F1. The axis 61 of the cam is controlled in rotation by an electric motor drive system, not shown, adapted to enable rotation of the axis in both directions.

The advanced end position of the first mobile member, which corresponds generally to a point of operation of a motor for a cruising mission of an aircraft, is shown in dotted lines in FIG. 5. In this end position, the corresponding position of the cam 60 relative to the first mobile member is shown in FIG. 10. The axis 61 of the cam is connected to the inner cylindrical wall 62 by a diametrical wall 65. In the advanced end position of the first mobile member, the diametrical wall 65 can be aligned with the longitudinal median plane passing through the longitudinal axis X, which here is the plane of symmetry of the first mobile member, or form an angle of a few degrees with this plane of symmetry as shown in FIG. 10. In this way, the torque to be exerted by the actuator on the axis 61 to maintain this end position remains weaker than in an intermediate position such as that shown in FIG. 5, even if the pressure of the airflow in the vein V (FIG. 1) on the first mobile member is substantial. This embodiment is therefore particularly adapted so that the drive mechanism (not shown) of the axis 61 is barely stressed during cruising missions which represent the majority of the flight duration, favouring the longevity of the mechanism.

In the position shown in FIG. 6, assuming the actuator breaks down, it can be provided to uncouple the axis 61 relative to for example the electric motor which drives it. The air pressure on the first mobile member can aid help the support of the roller 70 on the inner cylindrical wall 62 of the cam guide the cam to pivot by around a half-turn until the first mobile member reaches its retracted end position, that is, its safety position. A return spring can stress the axis 61 of the cam for example over less than a quarter turn to initiate the return movement if the air pressure on the first mobile member is sufficient to pivot the cam over the remainder of the return path without the aid of the spring.

In all the embodiments disclosed hereinabove, at least one actuator is housed fully or partly in the space between the side walls of the central part, this space therefore being located in the device 1 circumferentially between the two peripheral walls 2 and radially between the inner annular casing C1 and the outer annular casing C2. Such an arrangement is advantageous since it allows the presence of at least one actuator placed in the space as defined above without perturbing circulation of air in the ducts. The invention is however not limited to such an arrangement; it is possible by way of alternative to provide at least one actuator arranged radially inside the casing annular C1 and/or outside the annular casing C2.

An application of the device for circulation of air 1 is for the cooling of coolants used in the turbomachine.

In terms of such an application, a heat regulation system comprises the device 1 and at least one heat exchanger arranged in one and/or the other of the ducts of the circulation device (for example, in FIG. 2, a heat exchanger 8a is place in the conduit Ca and another heat exchanger 8b is located in the conduit Cb).

Each heat exchanger 8a, 8b comprises at least one sealed conduit adapted to convey fluid, this conduit extending transversally to the plane of FIG. 2 (only one section of each exchanger 8a, 8b is visible in FIG. 2).

When cold air circulates in a duct Ca, Cb, this air flows on the exchanger 8a, 8b arranged in the duct, and heat exchange takes place between this cold air and the hot fluid circulating in the exchanger via the wall of the exchanger, effectively cooling this fluid.

Of course, the same type of heat exchange can be possible to cool relatively hot air circulating in the device 1, by means of relatively cold fluid circulating in the exchanger 8a and/or 8b.

It is evident that the control of the airflow circulating in each duct in the second and third embodiments presented previously controls the heat exchange occurring in each duct.

Other variants of the air circulation device 1 can be possible.

Figure 7:
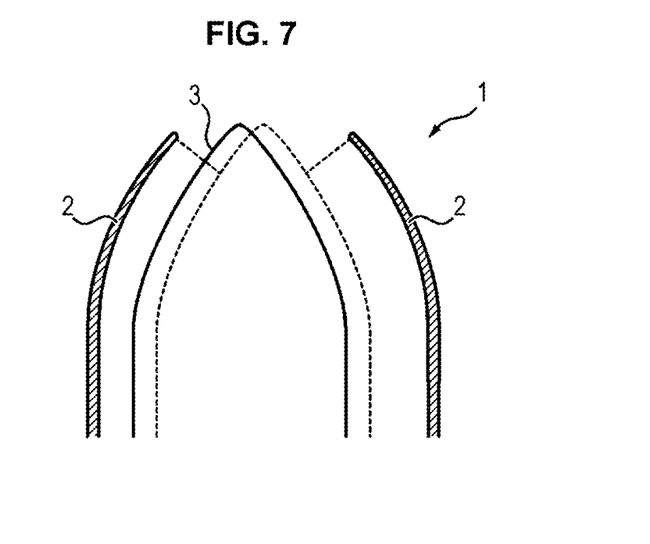
FIG. 7 is a sectional view of a device for circulation of air according to a fifth embodiment of the invention.

The two side walls 4, 5 can have identical profiles, that is, two symmetrical following a plane of symmetry identical to the longitudinal plane of symmetry of the peripheral walls 2, as shown in dots in FIG. 7. In this case, the sections of the inlets of the ducts Ca, Cb are equal.

As a variant, the first mobile member as shown in solid lines in FIG. 7 can be symmetrical according to a plane different to the plane of symmetry of the peripheral walls 2) so that the sections of the inlet orifices Ea, Eb of the ducts Ca, Cb are different to each other, as for the sections of the outlet orifices Sa, Sb. The central part 3 is in other terms offset laterally relative to a central position. For example, such an arrangement houses in the ducts heat exchangers of different sizes and adapted for airflows different from one duct to the other.

Figure 8:
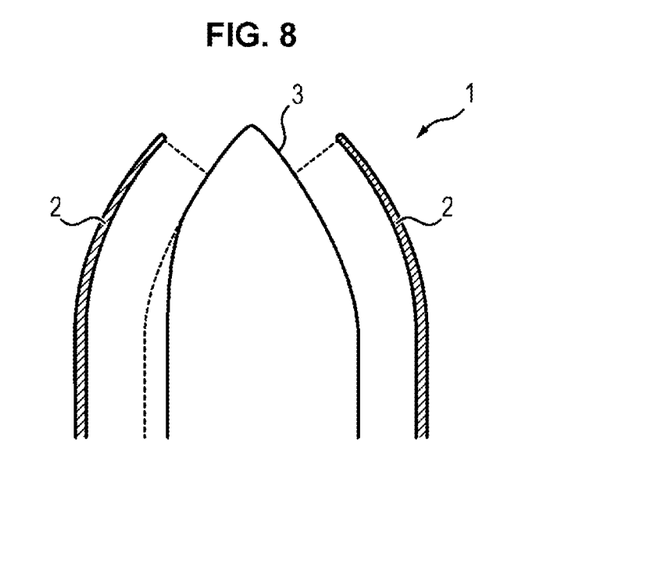
FIG. 8 is a sectional view of a device for circulation of air according to a sixth embodiment of the invention.

The side walls 4, 5 can also have profiles different to each other, that is, be non-symmetrical relative to each other, as shown in FIG. 8, for example so that the sections of the inlets of the ducts are identical, whereas the sections downstream of the inlets of the ducts become different. It is also possible to provide such side walls 4, 5 with different profiles in a central part 3 offset laterally relative to a central position of the device 1.

The second portions of side wall 42, 52 can further have profiles other then in an S, for example in a Z.

The device can comprise more than two ducts Ca, Cb formed in part by the central part 3. Several ducts Ca, Cb can in fact be arranged between the two annular casings, on either side of the median longitudinal plane.

The invention claimed is:

1. A device for circulation of air for a turbomachine, the device comprising:
    an inlet provided to receive incident airflow,
    air circulation ducts connected to the inlet,
    a central part comprising side walls,
    peripheral walls arranged at a distance from the central part so as to form the air circulation ducts, each duct being arranged between one of the side walls of the central part and one of the peripheral walls, each peripheral wall comprising:
        an upstream end portion delimiting with one of the side walls an inlet orifice of one of the ducts,
        a downstream end portion delimiting with one of the side walls an outlet orifice of one of the ducts,
    at least one member mobile in translation relative to the peripheral walls, the at least one mobile member being formed in the central part and arranged so that its displacement varies:
        a section of each of the inlet orifices,
        a section of at least one of the outlet orifices,
    wherein:
        the downstream end portion of each peripheral wall has a rectilinear profile,
        each side wall of the central part successively comprises:
            a first portion having a rectilinear profile,
            a second portion having a profile curved at least in part and extending the first portion,
            a third portion having a rectilinear profile, extending the second portion and extending in the same plane as the downstream end portion of a peripheral wall.

2. The device according to claim 1, wherein the at least one mobile member comprises:
    a first mobile member arranged so that its displacement simultaneously varies the section of each of the inlet orifices,
    a second mobile member arranged so that its displacement varies the section of at least one outlet orifice independently of the first mobile member.

3. The device according to claim 2, comprising a first actuator for shifting the first mobile member, and a second actuator for shifting the second mobile member.

4. The device according to claim 2, wherein:
    the first mobile member comprises the first rectilinear portion of a first of the side walls of the central part, and
    the second mobile member comprises the second portion of the first side wall.

5. The device according to claim 4, wherein the third portion of the first side wall is fixed relative to the peripheral wall facing the first side wall.

6. The device according to claim 4, wherein the second portion and the third portion of a second of the side walls of the central part are fixed relative to the peripheral wall facing the second side wall.

7. The device according to claim 1, wherein the at least mobile member comprises:
    a first mobile member arranged so that its displacement simultaneously varies the section of each of the inlet orifices,
    a second mobile member arranged so that its displacement varies the section of one of the outlet orifices, independently of the first mobile member,
    a third mobile member arranged so that its displacement varies the section of another of the outlet orifices, independently of the first mobile member and independently of the second mobile member.

8. The device according to claim 7, comprising a first actuator for shifting the first mobile member, a second actuator for shifting the second mobile member, and a third actuator for shifting the third mobile member.

9. The device according to claim 7, comprising a first actuator for shifting the first mobile member, and a common actuator connected to the second mobile member and to the third mobile member to shift them simultaneously.

10. The device according to claim 7, wherein:
    the first mobile member comprises the first rectilinear portion of a first of the side walls and of a second of the side walls, and
    the second mobile member comprises the second portion of the first side wall,
    the third mobile member comprises the second portion of the second side wall.

11. The device according to claim 10, wherein the third portion of the first side wall and the third portion of the second side wall are fixed relative to the peripheral walls.

12. The device according to claim 1, wherein the at least one mobile member is a single mobile member arranged so that its displacement simultaneously varies:
the section of each of the inlet orifices, and
the section of each of the outlet orifices.

13. The device according to claim 12, wherein, in each side wall,
the first portion is integral with the second portion,
the third portion is mobile relative to the first and second portions.

14. The device according to claim 12, wherein the third portion of each side wall is fixed relative to the peripheral walls.

15. The device according to claim 1, wherein the second portion of at least one of the side walls of the central part has an S-shaped profile.

16. The device according to claim 1, wherein the second portion of at least one of the side walls of the central part comprises at least one end portion having a rectilinear profile, said end portion being adapted to slide with contact along one of the first and third portions of the side wall.

17. The device according to claim 16, wherein the second portion comprises two opposite end portions which extend respectively in two planes parallel to each other.

18. The device according to claim 1, comprising at least one actuator adapted in the event of breakdown to stress at least one mobile member towards a safety position wherein each orifice section varied by said member is maximal.

19. The device according to claim 1, comprising at least one actuator adapted for shifting at least one mobile member and housed in a space between the side walls of the central part.

* * * * *